United States Patent [19]

Poff

[11] 4,093,000

[45] June 6, 1978

[54] RISING STEM VALVE POSITION INDICATOR

[76] Inventor: James S. Poff, 17310 Heritage Bay Dr., Webster, Tex. 77095

[21] Appl. No.: 798,812

[22] Filed: May 20, 1977

[51] Int. Cl.² ............. F16K 37/00; F16K 31/528
[52] U.S. Cl. ............. 137/554; 251/229; 251/264; 251/296
[58] Field of Search ............. 137/554, 556; 251/162, 251/263, 229, 252, 264, 269, 296

[56] References Cited

U.S. PATENT DOCUMENTS

| | | | |
|---|---|---|---|
| 3,023,783 | 3/1962 | Vickery | 251/315 X |
| 3,207,468 | 9/1965 | Lauducci et al. | 251/296 X |
| 3,473,554 | 10/1969 | King | 251/163 X |
| 3,789,875 | 2/1974 | McGee | 137/554 X |
| 3,854,696 | 12/1974 | Keyes et al. | 251/163 |

*Primary Examiner*—William R. Cline

[57] ABSTRACT

A position indicator is used to indicate the opened and closed positions of a rising stem valve. A sleeve is provided which is adapted to be attached to a handwheel and turns with the handwheel. A tubular shell is provided which is adapted to be attached to the valve stem and to be disposed within the sleeve so that it raises, lowers and rotates with the stem. At least one magnet is supported within the sleeve to rotate therewith. First and second reed switches with associated wiring are supported by the shell to be raised and lowered relative to the magnet for closing of the switches at the opened and closed valve positions.

4 Claims, 3 Drawing Figures

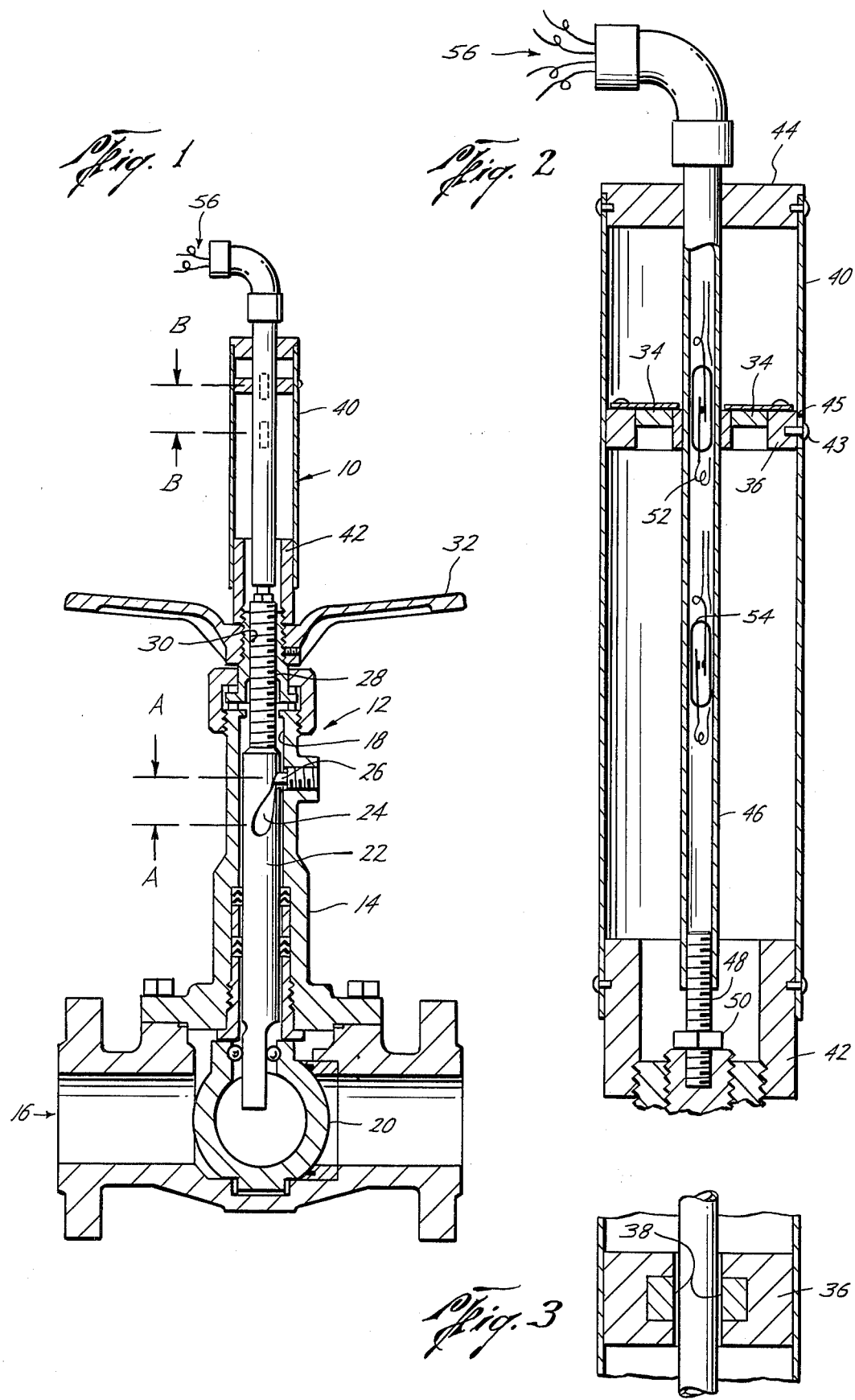

RISING STEM VALVE POSITION INDICATOR

Interest has recently increased in the storage of organic fluids especially hydrocarbons, in salt domes. This involves the use of a pipeline matrix for piping the fluids to and from the salt domes. This matrix is quite complicated with resultant errors being easily made, so that a fluid owned by one party could be piped into or out of a salt dome rented to another party. This action frequently happens because wrong valves in the matrix are opened and closed. To insure that the correct valves are open, an individual is sometimes sent around the matrix to visually observe the position of the rising stem of the valves. The use of an individual to visually observe the position is undesirable because of the waste of manpower and expense.

It has been suggested that valve position indicators be used to transmit a signal to a central location to indicate the opened and closed positions. These indicators have been designed in such a manner that they must be incorporated within the valve body at the time of manufacture of the valve. This causes a problem in pre-existing pipelines with valves already installed because the old valves must be replaced with new valves, which is very expensive.

An example of such a position indicator incorporated within a valve body is set forth in U.S. Pat. No. 3,538,948. The arrangement of the indicator has magnets positioned in the lower part of the gate. As the gate is raised and lowered, the passing magnets activate reed switches to indicate the position of the gate. This arrangement will not work in a valve having a core that does not rise, but merely rotates, as in a ball valve of the orbit type.

Such ball valve has a body with a ball core positioned within a flow passage of the valve body. The valve is opened and closed by rotating the ball core through an angle of 90°. A stem is positioned within a stem passage of the valve body to engage the ball core. The stem has a groove cut into the surface to coact with a pin extending from the body to cause an upward and downward camming action on the stem. This camming action causes the stem, as it is raised and lowered, to be rotated 90° between the opened and closed positions. A handwheel mechanism is rotatably attached to the valve body and has a threaded connection with the stem to raise and lower it by rotating a handwheel through a series of turns. One typical ball valve is sold by Orbit Valve Company having a configuration of FIG. 1523, and has a handwheel rotating through approximately 12½ revolutions with the stem rotating through approximately 90° while raising approximately 2 inches. Thus, several problems are created when using a ball valve that does not exist in other valves. Since the core does not raise and lower, the conventional idea of using the core to raise a magnet to and from the switches will not work. Moreover, the switches cannot be supported from the handwheel because the wiring associated with the switches would be destroyed from the twisting causing by rotating the handwheel through its series of turns.

Accordingly, it is a primary object of the present invention to provide a position indicator that may be added to a rising stem valve to indicate the opened and closed positions without the necessity of replacing the entire valve.

Another object of the invention is to provide a position indicator to be used with a rising stem valve to indicate the opening and closing of the valve wherein the valve is a ball valve which has a handwheel which rotates through a multiplicity of revolutions while the stem has a limited rotation.

Another object of the present invention is to provide a position indicator used with a rising stem valve using two magnets to open and close reed switches with each magnet disposed on diametrically opposed sides of the switches and a pole of one magnet facing the like pole of the other magnet to compensate for possible variations in magnetic strength and thereby make the action of the reed switches more reliable.

In accordance with the invention, a position indicator is provided which is adapted to be mounted on an existing valve of the orbit type. Thus, a sleeve is provided which is adapted for attachment to the handwheel mechanism of the valve for rotation therewith through the series of turns with the handwheel. A tubular shell of nonmagnetic material is also provided which is adapted for attachment to the stem and is disposed within the sleeve and is adapted to be raised, lowered and rotated by the stem. At least one magnet is supported within the sleeve at a distance from the handwheel mechanism and is rotatable with the sleeve about the shell. First and second reed switches with associated wiring are supported within the shell and separated by at least the distance necessary to raise and lower the stem when opening and closing the valve which in turn raises and lowers the switches relative to the magnet for closing the respective switch at the opened and closed valve positions while limiting any twisting of the wiring to the angle of rotation of the stem.

Other objects and advantages of the invention will become apparent upon reading the following detailed description and upon reference to the drawings, in which:

FIG. 1 is an elevational view, partly in section, of a valve position indicator constructed accordingly to the invention attached to a ball valve.

FIG. 2 is an enlarged elevational view of the valve position indicator illustrated in FIG. 1.

FIG. 3 is an enlarged elevational view of a modified arrangement of the magnets used in the embodiment illustrated in FIG. 2.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning first to FIG. 1, a position indicator 10 is shown attached to a rising stem valve 12 of the orbit type.

The valve has a valve body 14 defining a flow passage 16 and a valve stem passage 18. A hollow core 20 is disposed in flow passage 16 and rotatably moves 90° between an opened position, FIG. 1, and a closed position (not shown). A rising stem 22 extends down stem passage 18 to engage core 20. A groove 24 is located on the exterior of stem 22 and coacts with a guide pin 26 attached to valve body 14 to cause a camming action which rotates stem 22 through approximately 90° while rising. The raising and lowering is caused by threads 28 on stem 22 engaging threads 30 positioned concentrically in a handwheel 32 used in a handwheel mechanism. Thus, handwheel 32 is rotated about stem 22 to raise stem 22 with groove 24 and pin 26 coacting to rotate core 20 between the opened and closed positions. The raising and lowering necessary to open and close valve 12 is shown between the arrows A in FIG. 1.

As best shown in FIG. 2, position indicator 10 has at least one magnet 34. Preferably, two magnets 34 are positioned diametrically opposite to each other and disposed within a holder 36. More preferably, as shown in FIG. 3, magnets 34 are disposed in holder 36 and oriented with a pole 38 of one magnet 34 facing a like pole 38 of the other magnet 34. It has been found in this orientation that magnetic strength variation is compensated for and reed switch action is more reliable.

As shown in FIGS. 1 and 2, a sleeve 40 is attached to handwheel 32 as by threaded collar 42 for rotation therewith through the series of turns of handwheel 32. A dust cap 44 is located in the end opposite the end attached to threaded collar 34. Holder 36 is supported within sleeve 40 at a distance from the handwheel mechanism by using screw 43 extending through a slot 45 provided in container 40. Thus, magnets 34 are supported within sleeve 40 and are rotatable with sleeve 40 about shell 46. Preferably, sleeve 40 is tubular and elongated for concentrically fitting around raising stem 18 and shell 46.

Shell 46 is disposed in alignment with the rising movement of stem 22 and within sleeve 40. A bolt 48 is attached at one end of shell 40 and adapted for threaded connection with valve stem 22. A lock nut 50 is used to secure bolt 48 to stem 22. Preferably, shell 46 is elongated and tubular and disposed concentrically within sleeve 40.

A first reed switch 52 and a second reed switch 54 are supported within shell 46 at first and second positions, respectively. The first and second positions are displaced by the distance necessary for rising stem 22 to move when opening and closing valve 12. This distance is shown between arrows B—B in FIG. 1. Reed switches 52 and 54 may be of either normally opened or normally closed type. However, the normally closed type switches are preferred, such as those switches supplied by Hamlin-Newark Electronics having stock number 33F1057.

Suitable wiring 56 is attached to first reed switch 52 and second reed switch 54 to carry the electrical signals to indicate the opened and closed positions of valve 12. This may be accomplished by providing two conductors for each reed switch. However, it is preferred that only three conductors be used with one conductor acting as a common to the reed switches.

To construct indicator 10, the distance between first switch 52 and second switch 54 shown between arrows B—B is determined. This distance must be at least equal to the distance that rising stem 22 moves between the opened and closed positions of valve 12, shown between arrows A—A. However, the distance shown between arrows A—A can be slightly longer than the distance shown between arrows B—B because of the strength of magnets 34, which causes switches 52 and 54 to be activated prior to being exactly opposite the magnets 34. We have found in one embodiment that the distance shown between arrows B—B is one inch longer than that distance shown between arrows A—A. After the distance between first and second switch 52 and 54 is determined, the switches are positioned within shell 46. Shell 46 is positioned within sleeve 40 at the approximate location it will be when attached to valve 12. Magnets 34 are then provided between first and second switches 52 and 54 and adjusted within sleeve 40 relative to first switch 52 until an electrical signal is transmitted along suitable wiring 56 and the magnets 34 are generally located. Slot 45 is then provided through sleeve 40 at this location for attaching magnets 34 and holder 35 to sleeve 40 by screws 43 and permitting limited adjustment of magnets 34.

To attach indicator 10 to valve 12, threaded collar 42 is attached to handwheel 32. Shell 46 supporting first and second switches 52 and 54 is screwed into stem 22 by bolt 48 and locked into position by nut 50. Sleeve 40 supporting holder 36 and magnets 34 is disposed around second container 46 and is attached to threaded collar 42. Dust cap 44 is then attached to sleeve 40. Thus, sleeve 40, dust cap 44 and holder 36 with magnets 34 rotate with handwheel 32 to open and close valve 12, but no raising of magnets 34 relative to valve 12 takes place. Accordingly, first switch 52 and second switch 54 move past magnets 34 for activation at the opened and closed positions of valve 12. This arrangement limits the twisting of the associated wiring for switches 52 and 54 through the angle of rotation with stem 22.

Thus, it is apparent that there has been provided, in accordance with the invention, a position indicator for a rising stem valve that fully satisfies the objects, aims and advantages set forth above. While the invention has been described in conjunction with specific embodiments, thereof, it is evident that many alternatives, modifications and variations will be apparent to those skilled in the art in light of the foregoing description. Accordingly, it is intended to embrace all such alternatives, modifications and variations that fall within the spirit and broad scope of the appended claims.

What is claimed is:

1. A position indicator adapted for use with a valve having a body, a ball core positioned within a flow passage of the valve body and movable between an opened and a closed position by rotation through an angle of 90°, a stem positioned within a stem passage of the valve body to engage the ball core, said stem having a groove provided in the surface thereof to coact with a pin extending from the body to cause a camming action which rotates the core between opened and closed positions as the stem is raised, lowered and rotated, and a handwheel mechanism to raise and lower the stem by rotating a handwheel through a series of turns about the stem, including a sleeve adapted for attachment to said handwheel mechanism for rotation thereby through the series of turns with the handwheel, a tubular shell of non-magnetic material adapted for attachment to the stem and being disposed within said sleeve and adapted to be raised, lowered and rotated by the stem, at least one magnet supported within said sleeve at a distance from the handwheel mechanism and rotatable with said sleeve about said shell, and a first and a second reed switch with associated wiring supported within said shell separated by at least a distance necessary to raise and lower the stem when opening and closing the valve which in turn raises and lowers the switches relative to the magnet for activating the respective switch at the opened and closed valve positions while limiting any twisting of the wiring to the angle of rotation of the stem.

2. The position indicator of claim 1, wherein said sleeve is tubular and concentrically disposed around said tubular shell and two magnets are supported within said sleeve on diametrically opposed sides of said shell with a pole of one magnet facing a like pole of the other magnet in a direction substantially normal to the raising and lowering of the stem.

3. A device to indicate the opening and closing of a valve, comprising a valve body, a ball core positioned within a flow passage of said valve body and rotatable between an opened and closed position by rotation through an angle of 90°, a stem positioned within a stem passage of said valve body, engaging said ball core and having a groove provided in a surface thereof to coact with a pin extending from said valve body to cause a camming action which rotates the stem and core between opened and closed positions as the stem is raised and lowered, a handwheel mechanism to raise and lower said stem by rotating a handwheel through a series of turns about the stem, a sleeve attached to said handwheel mechanism and rotating through the series of turns with the handwheel, a tubular shell of non-magnetic material attached to said stem and being disposed within said sleeve and raised, lowered and rotated with said stem, at least one magnet supported within said sleeve at a distance from the handwheel mechanism and rotating with said sleeve about said shell, and a first and a second reed switch with associated wiring supported within said shell separated by at least a distance necessary to raise and lower the stem when opening and closing the valve which in turn raises and lowers the switches relative to the magnet for closing the respective switch at the opened and closed valve positions while limiting any twisting of the wiring to the angle of rotation of the stem.

4. The device of claim 3, wherein said sleeve is tubular and concentrically disposed around said tubular shell and two magnets are supported within said sleeve on diametrically opposed sides of said shell with a pole of one magnet facing a like pole of the other magnet in a direction substantially normal to the raising and lowering of the stem.

* * * * *

UNITED STATES PATENT AND TRADEMARK OFFICE
CERTIFICATE OF CORRECTION

PATENT NO. : 4,093,000
DATED : June 6, 1978
INVENTOR(S) : James S. Poff

It is certified that error appears in the above-identified patent and that said Letters Patent are hereby corrected as shown below:

In the ABSTRACT, line 11, "closing" should read -- activation --. Column 2, line 38, "accordingly" should read -- according --. Column 3, line 39, "closed" 2nd (occurrence) should read -- opened --.

Signed and Sealed this

Fourteenth Day of November 1978

[SEAL]

Attest:

RUTH C. MASON
Attesting Officer

DONALD W. BANNER
Commissioner of Patents and Trademarks